US012531362B2

(12) United States Patent
Ruan

(10) Patent No.: US 12,531,362 B2
(45) Date of Patent: Jan. 20, 2026

(54) ROTATABLE AND RETRACTABLE STRUCTURE FOR POWER PLUG

(71) Applicant: Shenzhen Shili Information Technology Co., LTD., Shenzhen (CN)

(72) Inventor: Xueyong Ruan, Shenzhen (CN)

(73) Assignee: Shenzhen Shili Information Technology Co., LTD., Shenzhen (CN)

( * ) Notice: Subject to any disclaimer, the term of this patent is extended or adjusted under 35 U.S.C. 154(b) by 430 days.

(21) Appl. No.: 18/328,804

(22) Filed: Jun. 5, 2023

(65) Prior Publication Data

US 2023/0318219 A1 Oct. 5, 2023

(30) Foreign Application Priority Data

Mar. 30, 2023 (CN) ........................ 202320672831.8

(51) Int. Cl.
*H01R 13/44* (2006.01)

(52) U.S. Cl.
CPC .................................... *H01R 13/44* (2013.01)

(58) Field of Classification Search
CPC .... H01R 13/44; H01R 13/447; H01R 13/502; H01R 24/68
See application file for complete search history.

(56) References Cited

U.S. PATENT DOCUMENTS 6,039,591 A * 3/2000 Marsh .................. H01R 4/5091 439/265
6,062,881 A * 5/2000 Ellison ............... H01R 13/4538 439/141
6,203,349 B1 * 3/2001 Nakazawa ........... H01R 13/623 439/314
2007/0155191 A1 * 7/2007 Buller .................. H01R 13/635 439/8
2010/0291779 A1 * 11/2010 Hopwood .............. H01R 24/28 439/131
2012/0009807 A1 * 1/2012 Kuo ....................... H01R 24/30 439/131
2016/0056600 A1 * 2/2016 Liao ....................... H01R 35/04 439/131
2018/0026388 A1 * 1/2018 Qin ....................... H01R 13/447 439/136
2018/0226755 A1 8/2018 Davies et al.
2021/0175671 A1 6/2021 Wu et al.
2022/0140554 A1 * 5/2022 Lybik ................... H01R 25/006 439/39
2023/0023612 A1 1/2023 Feng et al.
(Continued)

*Primary Examiner* — Truc T Nguyen

(57) ABSTRACT

Disclosed is a rotatable and retractable structure for power plug, including a lower housing, an upper housing, and pins, where the lower housing is fixedly connected with a lower cylinder, which has spiral grooves on inner wall of the lower cylinder; an upper cylinder is fixedly connected inside the upper housing, and the first limit bar is fixedly connected to the side wall of the lower cylinder, the lower cylinder is sleeved inside the upper cylinder, and the first limit bar is in contact with the top of the upper cylinder, the pins slide on the upper housing, and a retractable circular plate is fixedly connected with one end of the pins where the pins extend into the upper housing, a cylinder is fixedly connected on the side wall of the retractable circular plate and slides inside the spiral groove.

9 Claims, 9 Drawing Sheets

(56) References Cited

U.S. PATENT DOCUMENTS

| | | | | | |
|---|---|---|---|---|---|
| 2023/0134481 | A1* | 5/2023 | Tanaka | H01R 13/62905 | 439/248 |
| 2023/0231335 | A1* | 7/2023 | Kalkus | H02G 3/14 | 439/139 |

* cited by examiner

ROTATABLE AND RETRACTABLE STRUCTURE FOR POWER PLUG

TECHNICAL FIELD

The present utility model relates to the technical field of power plug, and in particular to a rotatable and retractable structure for power plug.

BACKGROUND

A power plug, also known as a charger, is a device that provides power to electronic products by connecting to a power socket. The existing mainstream power plugs include a body equipped with a circuit board and pins to be inserted into the socket, with the pins extending from the body.

With the development of society and the acceleration of the pace of life, people are traveling cross-regionally and internationally more frequently for business and tourism. Mobile phones and other electronic devices have become indispensable in people's lives. Therefore, to ensure that their phones can function normally during travel, people carry a power plug or charger with them.

However, currently available power plugs on the market have fixed pins that cannot be retracted into the body when not in use, resulting in large space occupation and inconvenience during transportation. Additionally, the fixed pins are prone to collide with other items while being carried, potentially causing damage or injury due to their sharpness. Furthermore, leaving the fixed pins exposed for extended periods of time can lead to corrosion, scratches, and damage, posing safety hazards during use.

SUMMARY

The purpose of this utility model is to solve the fixed pin problem in the prior art, and proposes a rotatable and retractable structure for power plug.

In order to achieve the above object, the present utility model adopts the following technical solution:

a rotatable and retractable structure for power plug includes a lower housing, an upper housing, and pins, where the lower housing is fixedly connected with a lower cylinder, which has spiral grooves on inner wall of the lower cylinder; an upper cylinder is fixedly connected inside the upper housing, and the first limit bar is fixedly connected to the side wall of the lower cylinder. The lower cylinder is sleeved inside the upper cylinder, and the first limit bar is in contact with the top of the upper cylinder; The pins slide on the upper housing, and a retractable circular plate is fixedly connected with one end of the pins where the pins extend into the upper housing. A cylinder is fixedly connected on the side wall of the retractable circular plate and slides inside the spiral groove.

Preferably, a supporting plane is provided at one end of the spiral groove away from the lower housing in order to enhance stability during operation.

Preferably, in order to improve stability during retraction, four spiral grooves are provided, and there are also four cylinders, each of which slides inside the corresponding spiral groove.

Preferably, a step is provided inside the lower cylinder, which is located at the bottom of the spiral groove.

To enhance stability during rotation, preferably, the second limit bar is fixedly connected to the side wall of the lower cylinder, and the inner wall of the upper cylinder is provided with a limit groove, in which the second limit bar slides.

Preferably, the retractable circular plate is fixedly connected with conductive elastic pieces, and the pins are in contact with the conductive elastic pieces via through-holes.

In order to achieve smoother retraction, preferably, a fixing bracket is securely attached inside the upper housing, which is provided with a guiding groove for guiding the sliding movement of the conductive elastic pieces.

Preferably, the bottom of the lower cylinder is fixedly connected with a lower plate. A lower groove is provided on the lower housing, and the lower plate is fixed in the lower groove.

Preferably, the bottom of the upper cylinder is provided with an upper plate. An upper groove is provided at the bottom of the upper housing, and the upper plate is fixed in the upper groove.

In comparison to prior art, the present utility model provides a rotatable and retractable structure for power plug, which has the following beneficial effects:

1. As for the rotatable and retractable structure for power plug, by clamping the upper cylinder and the lower cylinder, the lower housing and the upper housing can only rotate relative to each other. During the rotation of the upper housing, the retractable circular plate is driven to move through the spiral groove, thereby achieving the purpose of retracting the pins.
2. As for the rotatable and retractable structure for power plug, when the pins are in their operation state protruding from the upper housing, the cylinder is located on the supporting plane. The supporting plane limits the movement of the cylinder and prevents the pins from retracting when inserting the pins into the socket.
3. As for the rotatable and retractable structure for power plug, the four spiral grooves and the corresponding cylinder enable the retractable circular plate to rotate and move smoothly when the upper housing rotates, thus ensuring smoother retracting or stretching of the pins.
4. As for the rotatable and retractable structure for power plug, by sliding the second limit bar inside the limit groove and clamping with the first limit bar in synchronization, the stability of rotation between the lower cylinder and the upper cylinder is effectively improved.

Figure 1:
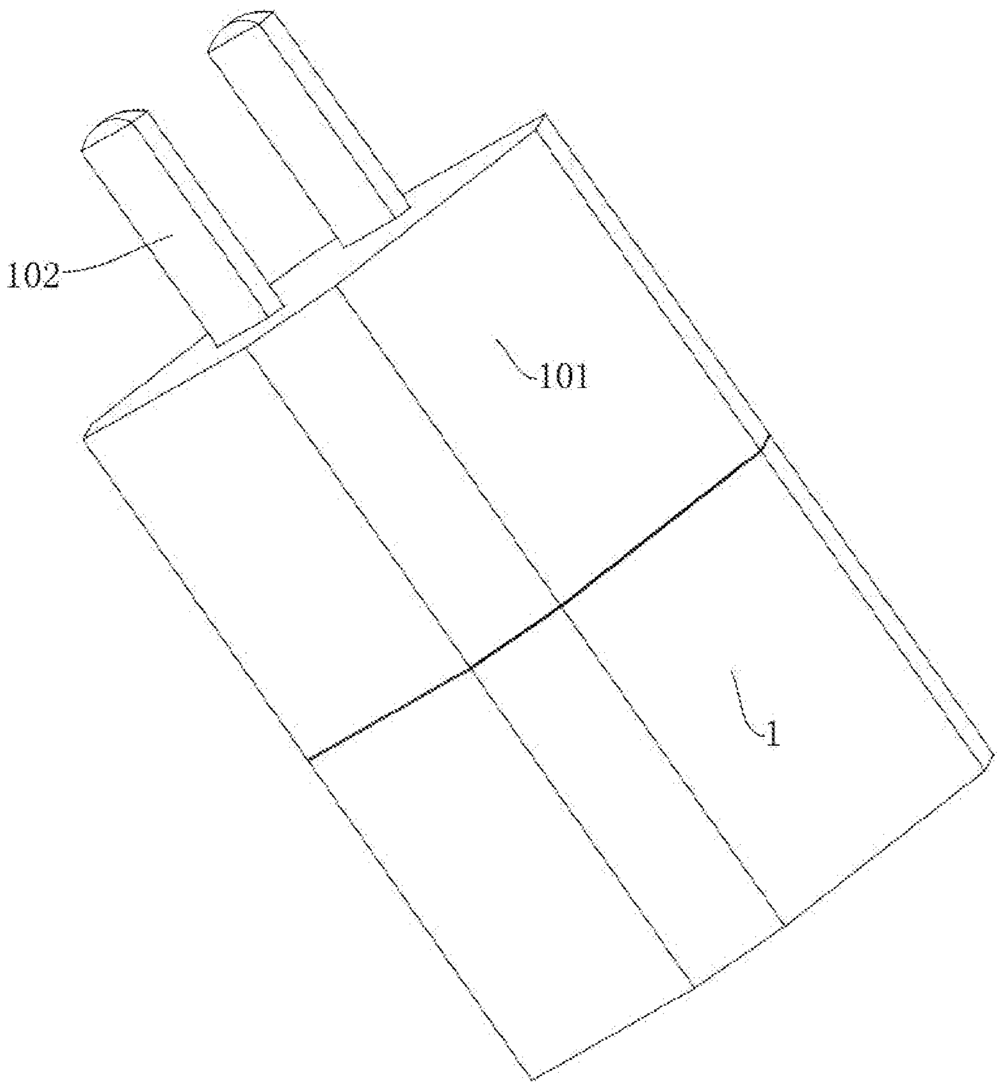
FIG. 1 is a structure schematic diagram I of a rotatable and retractable structure for power plug proposed in the present utility model.

In the FIGs: 1. lower housing; 101. upper housing; 102. pin; 2. lower cylinder; 201. lower plate; 202. lower groove; 3. upper cylinder; 301. upper plate; 302. upper groove; 4. first limit bar; 401. second limit bar; 402. limit groove; 5. retractable circular plate; 501. cylinder; 502. spiral groove; 503. supporting plane; 6. conductive elastic piece; 601. fixing bracket; 602. guiding groove; 7. through-hole; 8. step.

DESCRIPTION OF THE EMBODIMENTS

The following description, in conjunction with the accompanying drawings of this utility model embodiment, provides a clear and complete disclosure of the technical solution in this utility model embodiment. It should be noted that the embodiments described herein are only a part of the embodiments of this utility model, not all of them.

In the description of this utility model, it should be understood that the terms “up”, “down”, “front”, “back”, “left”, “right”, “top”, “bottom”, “inside”, “outside”, and other directional or positional relationships refer to the orientation or position relationship shown in the accompanying drawings. They are used only for the purpose of describing and simplifying the description of this utility model, and do not indicate or imply that the device or component referred to must have a specific orientation, be constructed and operated in a particular orientation, and therefore should not be understood as a limitation on this utility model.

Embodiment 1

Referring to FIG. 1-FIG. 9, a rotatable and retractable structure for power plug includes a lower housing 1, an upper housing 101, and pins 102, where the lower housing 1 is fixedly connected with a lower cylinder 2 which has a spiral groove 502 on inner wall of the lower cylinder; the upper housing 101 is fixedly connected with an upper cylinder 3, and a first limit bar 4 is fixedly connected to the side wall of the lower cylinder 2. The lower cylinder 2 is sleeved inside the upper cylinder 3, with their outer and inner walls in close contact; the first limit bar 4 is in contact with the top of the upper cylinder 3, preventing the upper cylinder 3 from detaching and allowing it to rotate around the lower cylinder 2 only; and consequently, the lower housing 1 and the upper housing 101 can only rotate relatively to each other, but cannot detach.

The pins 102 slide on the upper housing 101 and extend into one end fixedly connected to a retractable circular plate 5 inside the upper housing 101, and the retractable circular plate 5 is fixedly connected with a cylinder 501 on side wall of the retractable circular plate, and the cylinder 501 slides in a spiral groove 502.

The pins 102 are electrically connected to the PCBA board, which is secured inside the lower housing 1.

When it is necessary to retract the pins 102 in the upper housing 101, the upper housing 101 is rotated to drive the upper cylinder and the pins 102 to rotate around the upper housing 101 and the lower cylinder 2. During the process of rotation, pins 102 will drive the retractable circular plate 5 to rotate synchronously. Since the cylinder 501 slides in the spiral groove 502 and the lower cylinder 2 remains relatively stationary, during the rotation of the upper housing 101, the cylinder 501 will move synchronously downward under the action of the spiral groove 502 until it retracts into the upper housing 101, completing the retraction of the pins 102.

As a result, when it is carried or not in use, the pins 102 can retract to reduce space occupation, overcoming the problem of inconvenient carrying, and avoiding interference with other items. Meanwhile, the retractable pins 102 also avoid problems such as corrosion, scratches, and damage, reducing safety hazards during use.

When needed, simply the upper housing 101 is rotated reversely and the pins 102 will extend upward from the upper housing 101 again under the action of the spiral groove 502.

By clamping the upper cylinder 3 with the lower cylinder 2, the lower housing 1 and the upper housing 101 are allowed to rotate relatively to each other. As the upper housing 101 rotates, the spiral groove 502 drives the retractable circular plate 5 to move, achieving the purpose of retracting the pins 102.

Figure 5:
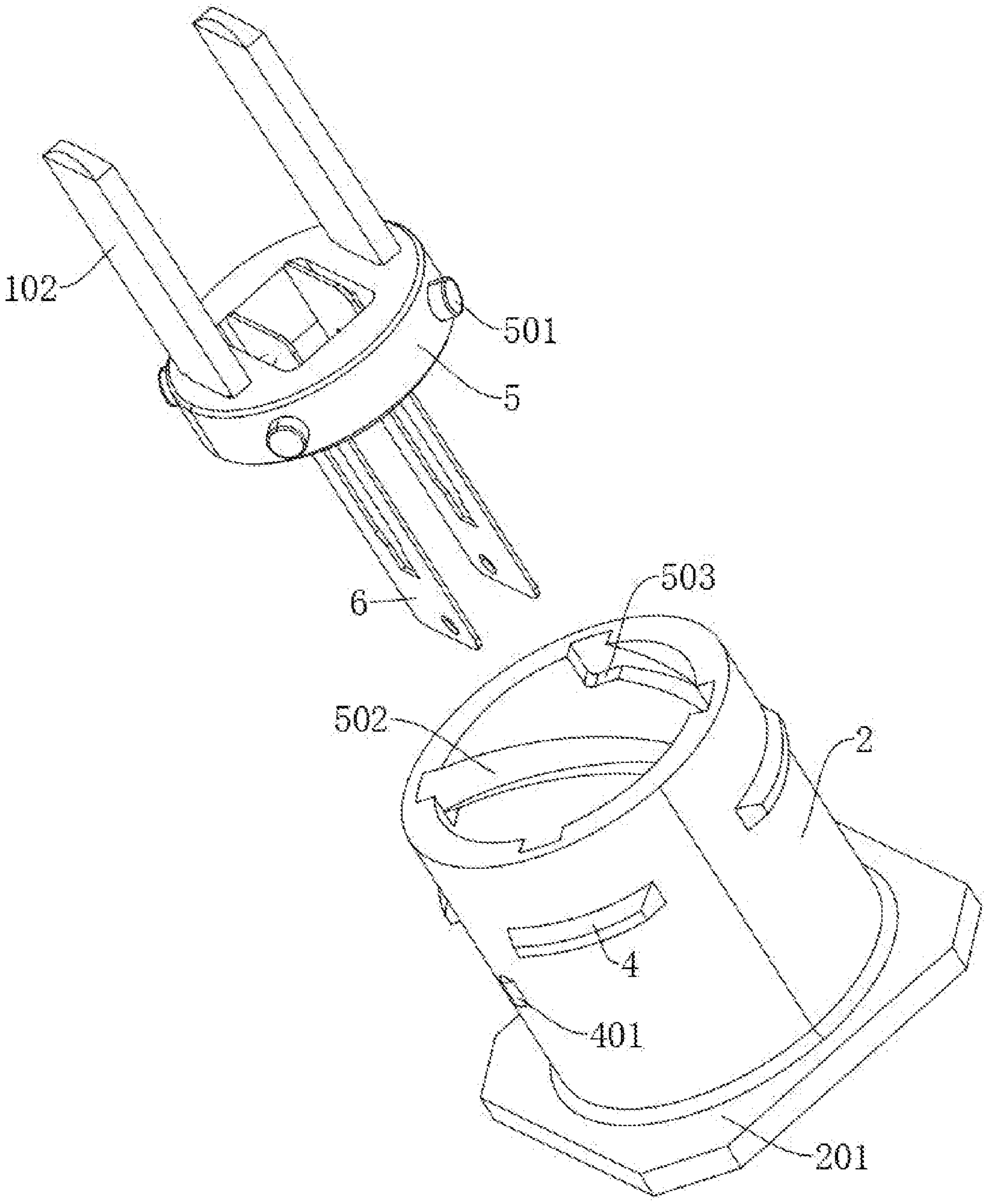
FIG. 5 is a structure schematic diagram of a conductive elastic piece of a rotatable and retractable structure for power plug proposed in the present utility model.
Figure 6:
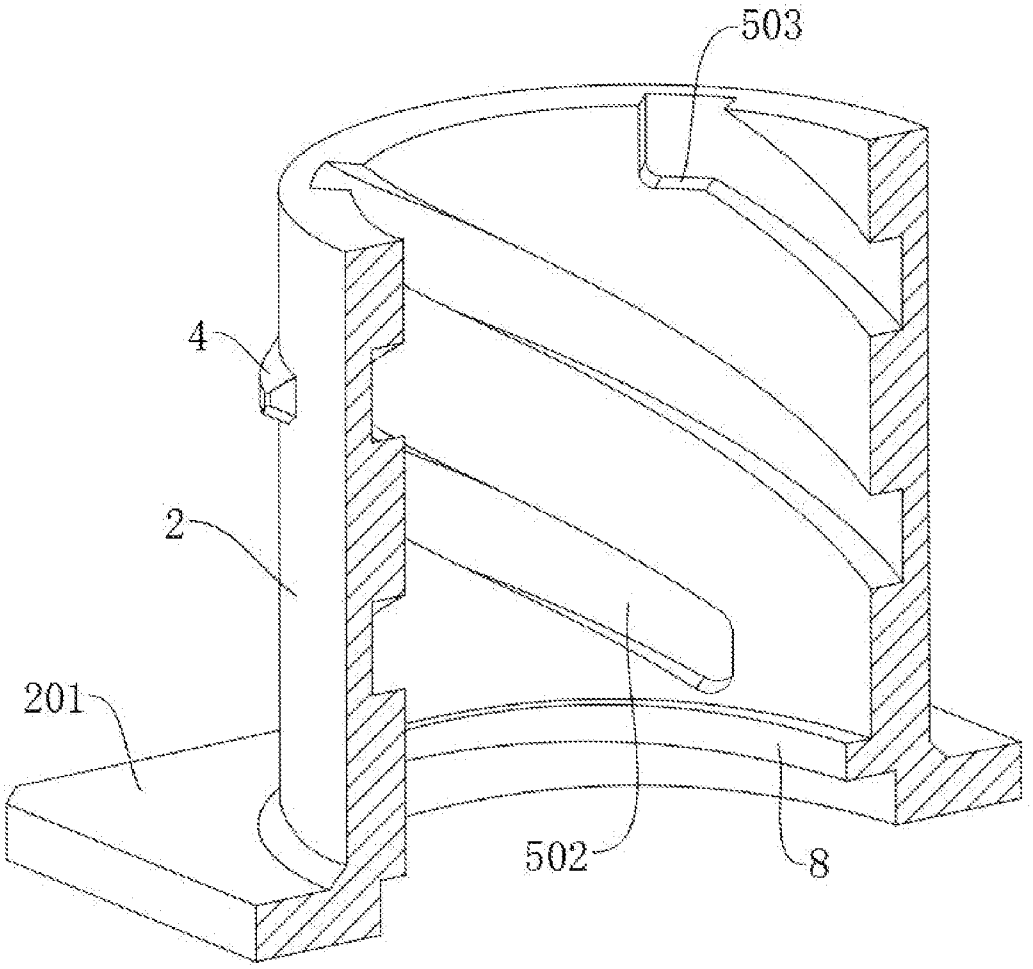
FIG. 6 is a structure schematic diagram of a spiral groove of a rotatable and retractable structure for power plug proposed in the present utility model.

As shown in FIGS. 5 and 6, a supporting plane 503 is provided at one end of the spiral groove 502 away from the lower housing 1.

When the pins 102 extend out of the upper housing 101, the cylinder 501 is situated on the supporting plane 503. The pins 102 will not be retracted due to force during the insertion process into the socket, thanks to the limiting effect of the supporting plane 503 on the cylinder 501.

That is to say, the cylinder 501 is seated on the supporting plane 503. By simply applying a downward force to the pins 102 without rotating the upper housing 101, the pins 102 will not retract inward. Only by rotating the upper housing 101 will the pins 102 retract.

Embodiment 2

Referring to FIG. 1 to FIG. 9, the present embodiment is substantially the same as Embodiment 1. Based on Embodiment 1, further optimization has been made to the overall technical solution, which improves the stability of the retraction of the pins 102.

Figure 9:
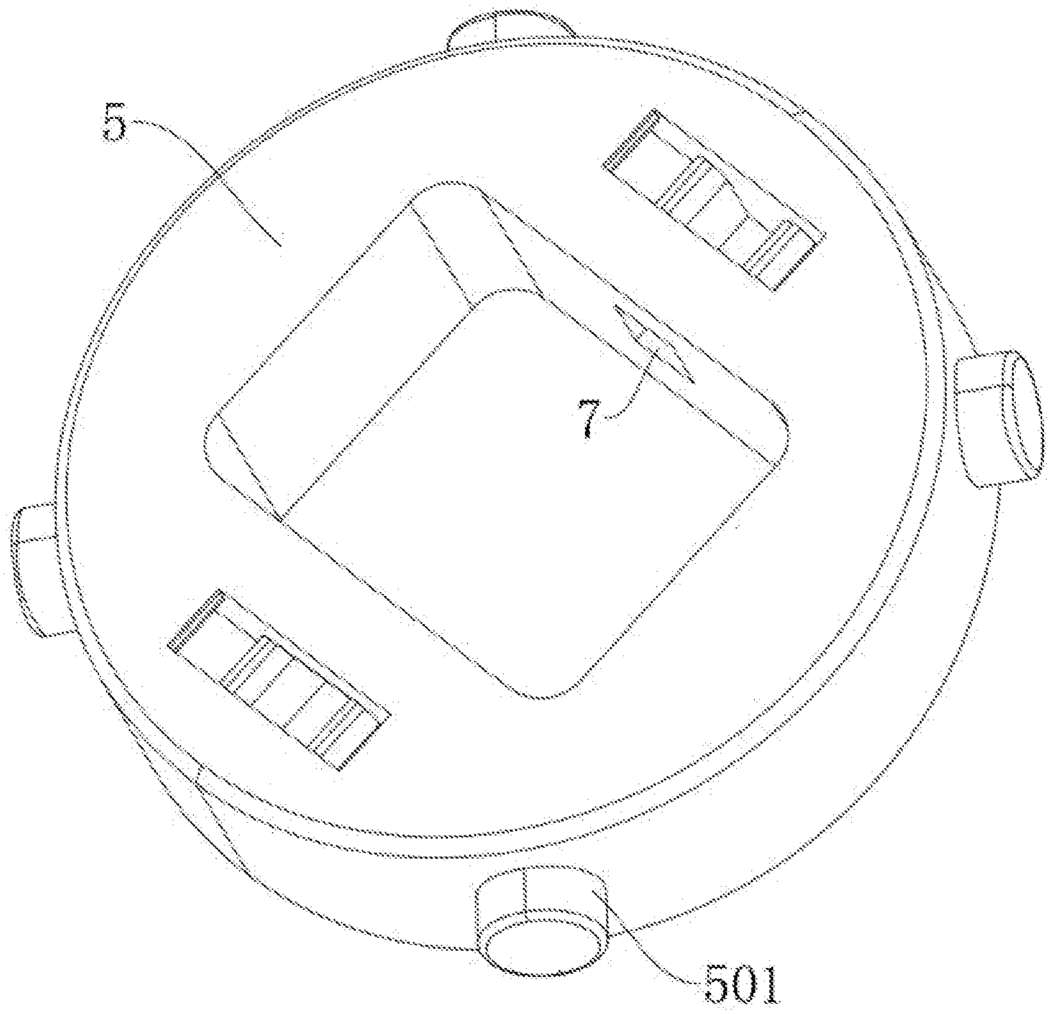
FIG. 9 is a structure schematic diagram of a retractable circular plate of a rotatable and retractable structure for power plug proposed in the present utility model.

As shown in FIGS. 5 and 9, there are four spiral grooves 502 and four cylinders 501 respectively. Each cylinder 501 slides in its corresponding spiral groove 502.

In the process of driving the retractable circular plate 5 to rotate by the upper housing 101 through four spiral grooves 502 and the corresponding cylinder 501, the retractable circular plate 5 will rotate and move more smoothly, thereby enabling the pins 102 to retract or extend more smoothly.

The four spiral grooves 502 can rotate clockwise or counterclockwise.

As shown in FIG. 6, there is a step 8 inside the lower cylinder 2, the step 8 is located at the bottom of the spiral groove 502, and the step 8 is integrally formed with the lower cylinder 2.

When the pins 102 are fully retracted into the upper housing 101, the retractable circular plate 5 is in contact with the step 8, restricting further downward movement.

As shown in FIGS. 2 to 5, the second limit bar 401 is fixedly connected to the side wall of the lower cylinder 2, and the inner wall of the upper cylinder 3 is provided with a limit groove 402, the second limit bar 401 slides inside the limit groove 402. The second limit bar 401 is distributed in segments along the circumference of the side wall of the lower cylinder 2, rather than being continuous.

The upper cylinder 3 has notches on the side wall of the upper cylinder for easily clamping with and fitting onto the lower cylinder 2.

The stability of the rotation between the lower cylinder 2 and the upper cylinder 3 is effectively enhanced by sliding the second limit bar 401 into and clamping second limit bar 401 with the limit groove 402, and coordinating second limit bar 401 with the synchronized first limit bar 4.

Figure 2:
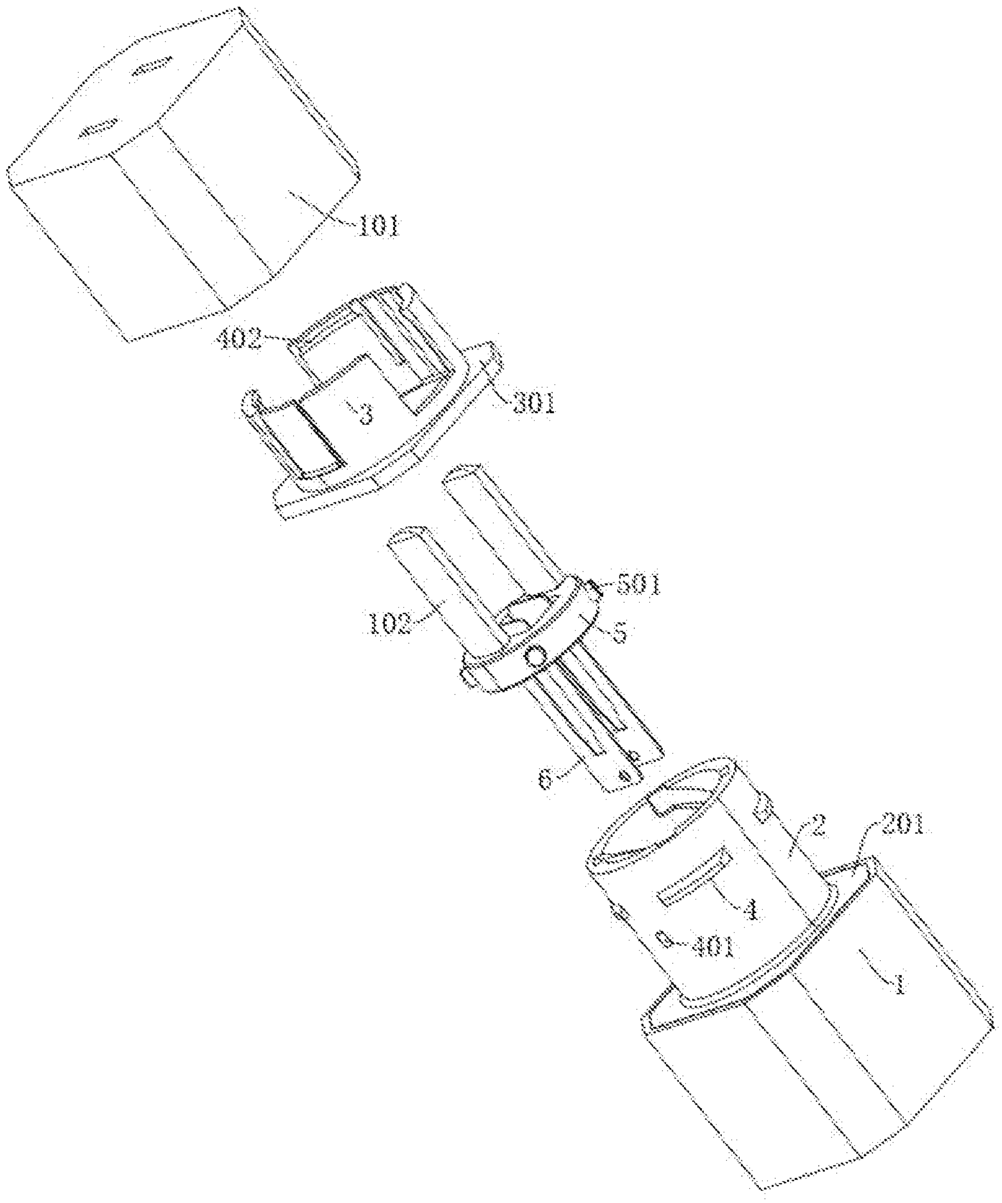
FIG. 2 is a structure schematic diagram II of a rotatable and retractable structure for power plug proposed in the present utility model.
Figure 3:
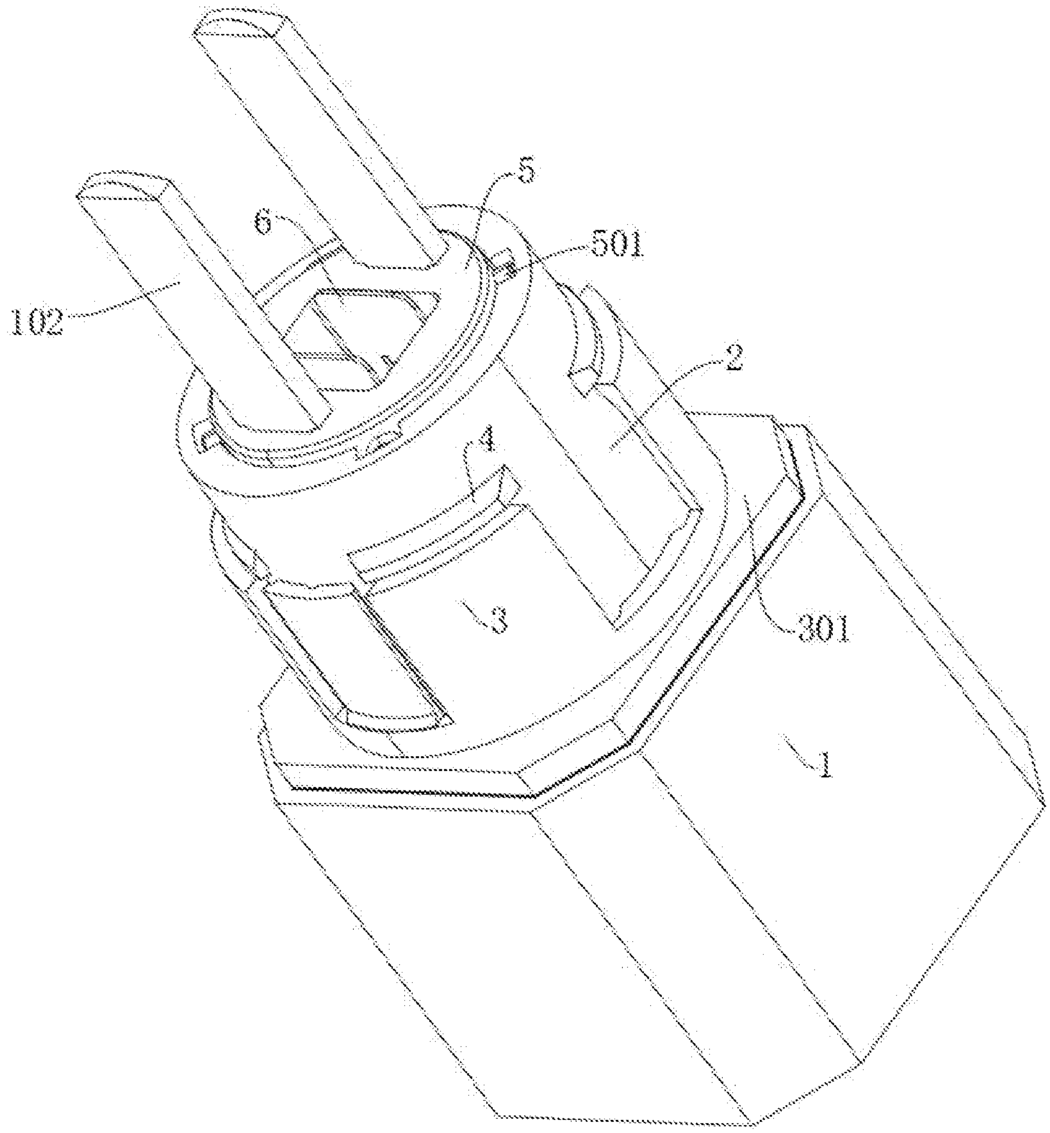
FIG. 3 is a structure schematic diagram III of a rotatable and retractable structure for power plug proposed in the present utility model.
Figure 4:
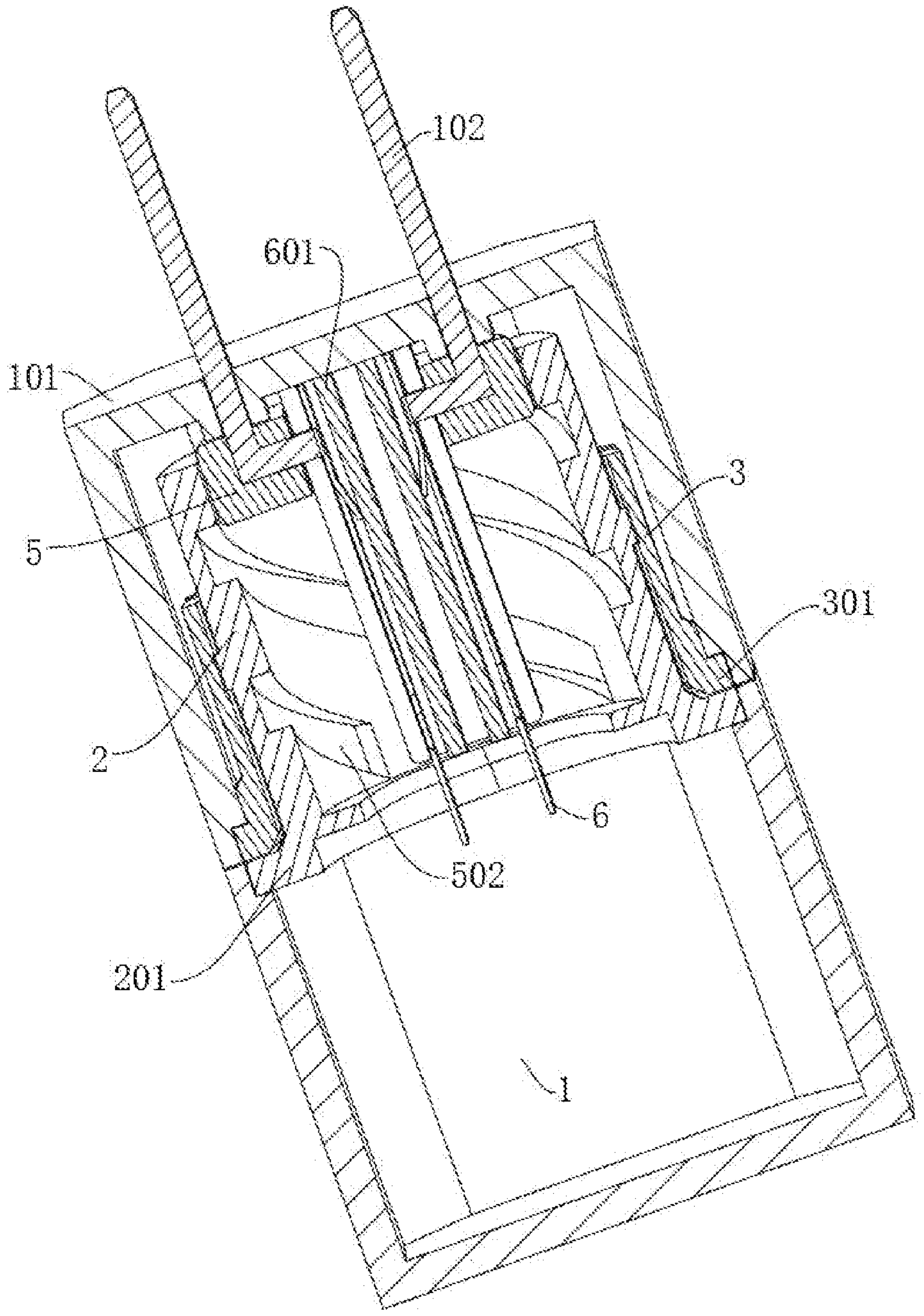
FIG. 4 is a section view of a rotatable and retractable structure for power plug proposed in the present utility model.

In FIG. 2, FIG. 4, and FIG. 5, a conductive elastic piece 6 is fixedly connected inside the retractable circular plate 5, and the pins 102 are in contact with the conductive elastic piece 6 through a through-hole 7.

Herein, "the pins 102 are electrically connected to the PCBA board" is adjusted to "the conductive elastic piece 6 is electrically connected to the PCBA board".

During operation, the pins 102 transfer electric energy to the conductive elastic piece 6, which then transmits the electric energy to the PCBA board. Finally, the PCBA board and an external charging cable are utilized to charge the electric equipment.

When the pins 102 retract into the upper housing 101, the bottom of the conductive elastic piece 6 will move synchronously into the lower housing 1.

Figure 8:
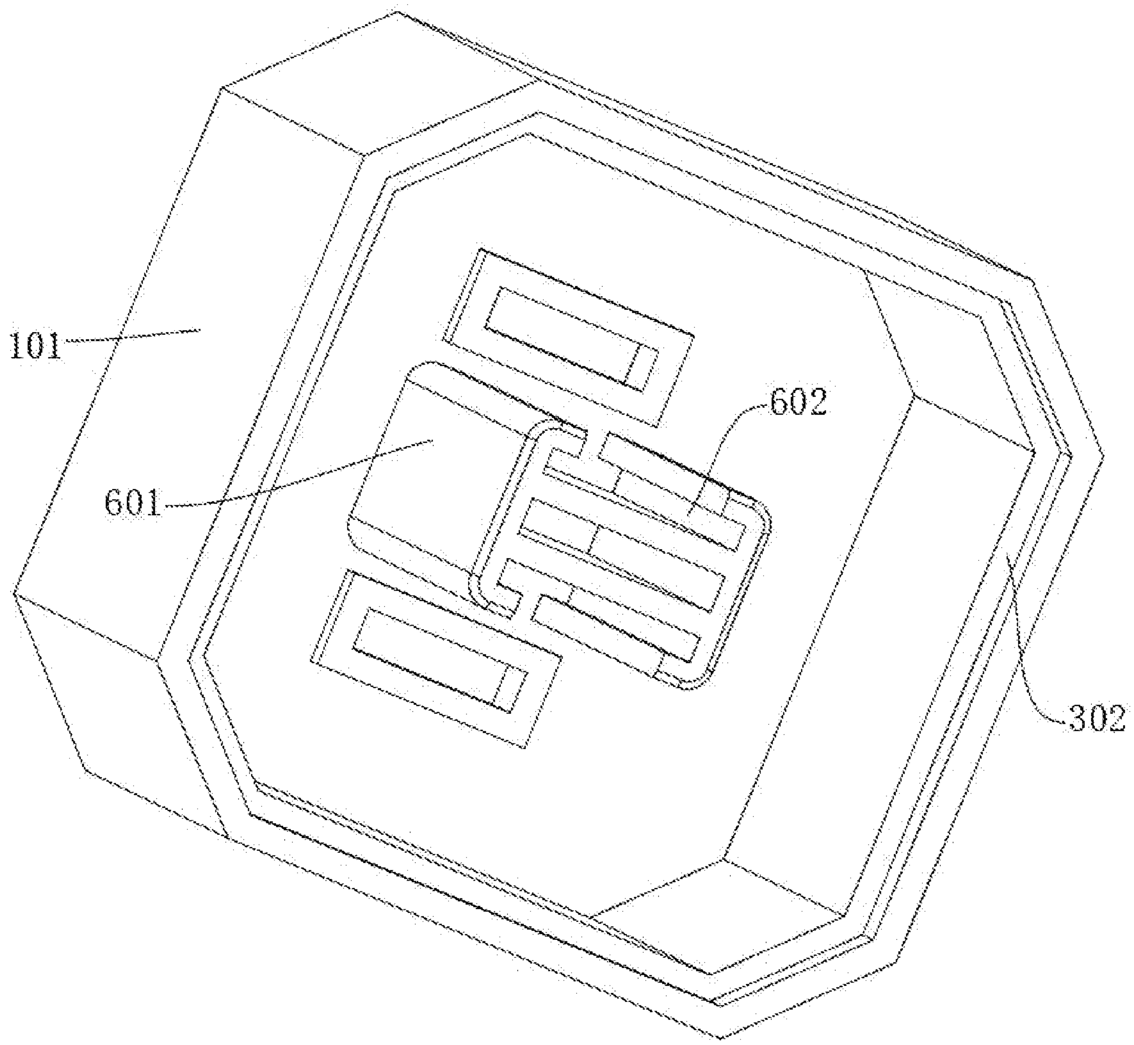
FIG. 8 is a structure schematic diagram of a fixing bracket of a rotatable and retractable structure for power plug proposed in the present utility model.

Referring to FIGS. 4 and 8, a fixing bracket 601 is fixedly connected inside the upper housing 101, and a guiding groove 602 is provided on the fixing bracket 601. The conductive elastic piece 6 slides inside the guiding groove 602.

By sliding in the guiding groove 602, the conductive elastic piece 6 serves as a guide and prevents any wobbling of the conductive elastic piece 6, thereby ensuring that pins 102 can smoothly retract and extend.

The fixing bracket 601 is adhesively secured in the upper housing 101.

Embodiment 3

Referring to FIG. 1 to FIG. 9, the embodiment is basically the same as Embodiment 2. Further optimizations have been made to the overall technical solution based on Embodiment 2.

Figure 7:
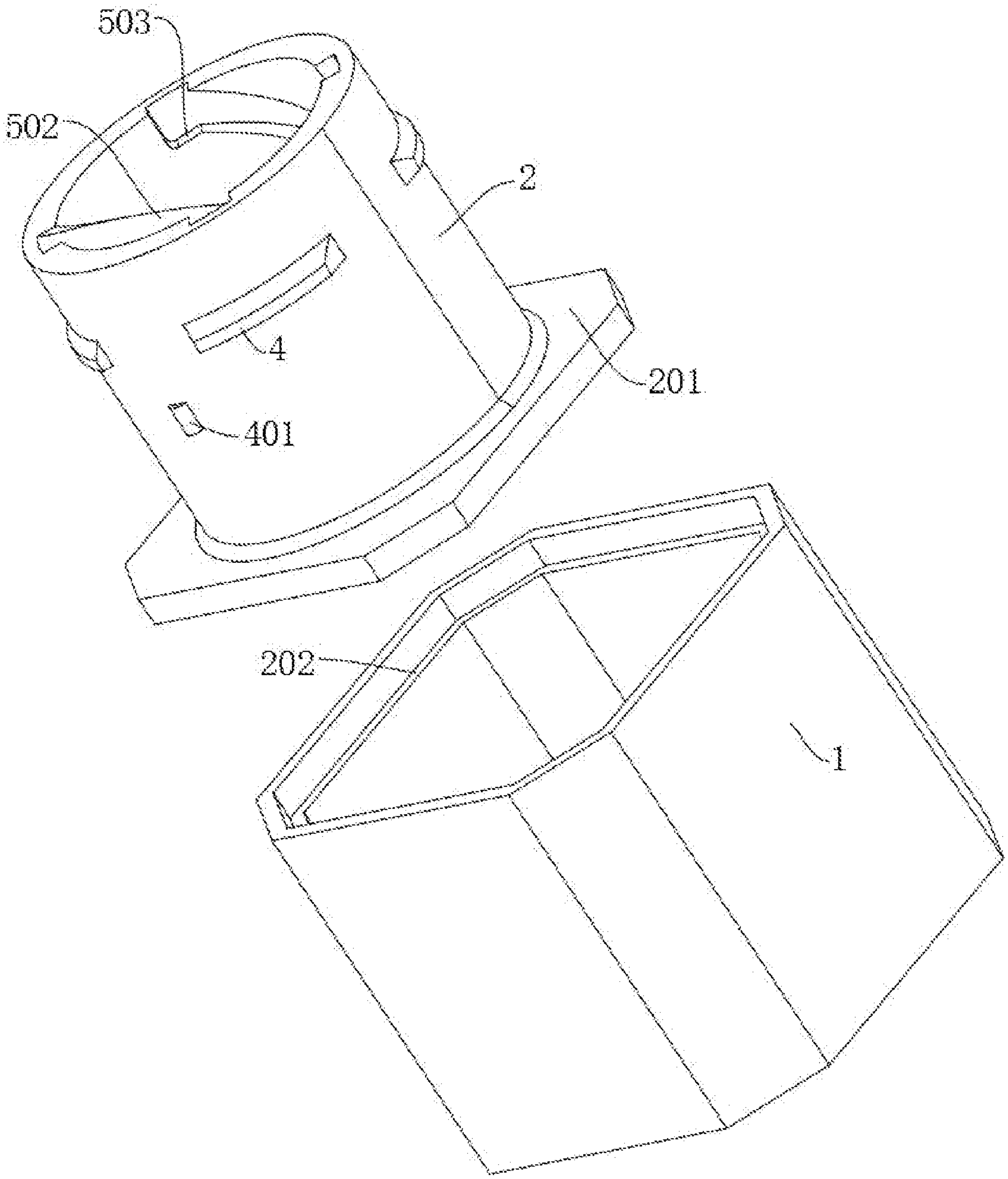
FIG. 7 is a structure schematic diagram of a lower cylinder of a rotatable and retractable structure for power plug proposed in the present utility model.

As shown in FIG. 6 and FIG. 7, the bottom of the lower cylinder 2 is fixedly connected with a lower plate 201, and a lower groove 202 is provided on the lower housing 1. The lower plate 201 is fixed in the lower groove 202.

There is a groove on the lower plate 201, where the lower cylinder 2 passes and is connected both above and below.

To facilitate installation, the lower cylinder 2 is clamped in the lower groove 202 via the lower plate 201, which is then secured using an adhesive. This design allows easy installation of the lower cylinder 2 via the lower plate 201.

As shown in FIG. 2 and FIG. 8, the upper cylinder 3 is equipped with an upper plate 301 at the bottom, an upper groove 302 is provided at the bottom of an upper housing 101. The upper plate 301 is fixed in the upper groove 302.

Similar to the lower plate 201, the upper plate 301 also has a groove through which the upper cylinder 3 passes and is connected both above and below.

During installation, the upper cylinder 3 is clamped in the upper groove 302 via the upper plate 301 and then secured with an adhesive.

The above description is merely the preferred embodiment of this utility model, but the protection scope of this utility model is not limited thereto. Those skilled in the art should fall within the scope of protection if they make equivalent substitutions or modifications based on the technical scheme and constructive concept disclosed in this utility model within the technical scope hereby disclosed.

What is claimed is:

1. A rotatable and retractable structure for power plug comprising a lower housing (1), an upper housing (101) and pins (102), wherein, the lower housing (1) is fixedly connected with a lower cylinder (2), and an inner wall of the lower cylinder (2) is provided with a spiral groove (502);

the upper housing (101) is fixedly connected with an upper cylinder (3), and a first limit bar (4) is fixedly connected to a side wall of the lower cylinder (2), the lower cylinder (2) is sleeved inside the upper cylinder (3), and the first limit bar (4) contacts with a top of the upper cylinder (3); and the pins (102) slide on the upper housing (101), and a retractable circular plate (5) is fixedly connected with one end of the pins wherein the pins (102) extend into the upper housing (101), a cylinder (501) is fixedly connected on the side wall of the retractable circular plate (5) and the cylinder (501) slides inside the spiral groove (502).

2. The rotatable and retractable structure for power plug according to claim 1, wherein the spiral groove (502) is provided with a supporting plane (503) at one end away from the lower housing (1).

3. The rotatable and retractable structure for power plug according to claim 1, wherein there are four spiral grooves (502) and four cylinders (501) and the four cylinders (501) slides in the corresponding spiral grooves (502), respectively.

4. The rotatable and retractable structure for power plug according to claim 1, wherein a step (8) is provided inside the lower cylinder (2), and the step (8) is located at the bottom of the spiral groove (502).

5. The rotatable and retractable structure for power plug according to claim 1, wherein a second limit bar (401) is fixedly connected to the side wall of the lower cylinder (2), a limit groove (402) is provided on the inner wall of the upper cylinder (3), and the second limit bar (401) slides in the limit groove (402).

6. The rotatable and retractable structure for power plug according to claim 1, wherein a conductive elastic piece (6) is fixedly connected in the retractable circular plate (5), and the pins (102) are in contact with the conductive elastic piece (6) through a through-hole (7).

7. The rotatable and retractable structure for power plug according to claim 6, wherein a fixing bracket (601) is fixedly connected inside the upper housing (101), and a guiding groove (602) is provided on the fixing bracket (601), and the conductive elastic piece (6) slides in the guiding groove (602).

8. The rotatable and retractable structure for power plug according to claim 1, wherein the bottom of the lower cylinder (2) is fixedly connected with a lower plate (201), and a lower groove (202) is provided on the lower housing (1), the lower plate (201) is fixed inside the lower groove (202).

9. The rotatable and retractable structure for power plug according to claim 1, wherein the bottom of the upper cylinder (3) is provided with a upper plate (301), and an upper groove (302) is provided at the bottom of the upper housing (101), the upper plate (301) is fixed inside the upper groove (302).

* * * * *